(12) United States Patent
Sze et al.

(10) Patent No.: US 8,941,620 B2
(45) Date of Patent: *Jan. 27, 2015

(54) SYSTEM AND METHOD FOR A VIRTUAL MULTI-TOUCH MOUSE AND STYLUS APPARATUS

(75) Inventors: Cheng-Feng Sze, San Jose, CA (US); Raymyung Cha, Sunnyvale, CA (US); Jae Eul Koo, Seoul (KR); Koang Hui Jeong, Seoul (KR)

(73) Assignee: Celluon, Inc., Seoul (KR)

( * ) Notice: Subject to any disclaimer, the term of this patent is extended or adjusted under 35 U.S.C. 154(b) by 485 days.

This patent is subject to a terminal disclaimer.

(21) Appl. No.: 13/393,810

(22) PCT Filed: Jan. 5, 2011

(86) PCT No.: PCT/US2011/020253
§ 371 (c)(1),
(2), (4) Date: Mar. 1, 2012

(87) PCT Pub. No.: WO2011/085023
PCT Pub. Date: Jul. 14, 2011

(65) Prior Publication Data
US 2012/0162077 A1    Jun. 28, 2012

Related U.S. Application Data

(60) Provisional application No. 61/292,653, filed on Jan. 6, 2010.

(51) Int. Cl.
*G06F 3/042* (2006.01)

(52) U.S. Cl.
CPC .... *G06F 3/0425* (2013.01); *G06F 2203/04104* (2013.01)

USPC .......................................................... 345/175

(58) Field of Classification Search
CPC ........................................... G06F 3/042–3/0428
USPC ..................... 345/156–184; 178/18.01–20.04
See application file for complete search history.

(56) References Cited

U.S. PATENT DOCUMENTS

| | | | |
|---|---|---|---|
| 5,742,279 A * | 4/1998 | Yamamoto et al. | 345/173 |
| 5,825,352 A | 10/1998 | Bisset et al. | |
| 6,040,825 A * | 3/2000 | Yamamoto et al. | 345/173 |
| 6,690,354 B2 | 2/2004 | Sze | |
| 6,710,770 B2 | 3/2004 | Tomasi et al. | |
| 7,215,327 B2 | 5/2007 | Liu et al. | |
| 7,242,388 B2 | 7/2007 | Lieberman et al. | |
| 7,305,368 B2 | 12/2007 | Lieberman et al. | |
| 8,462,135 B1 * | 6/2013 | Xiao et al. | 345/174 |
| 8,497,841 B1 * | 7/2013 | Sze et al. | 345/168 |

(Continued)

*Primary Examiner* — Patrick F Marinelli
(74) *Attorney, Agent, or Firm* — Seed IP Law Group PLLC

(57) ABSTRACT

A virtual multi-touch input device uses an optical camera system and a processor to detect locations and motions of objects in a virtual working area and to transfer information about the locations and motions of the objects to a host device, such as a personal computer (PC) or a cellular phone. When the user's finger or objects touch a region of interest lit by a flat fan beam of light, the lit portions of the finger or objects are imaged by the optical camera system and the processor processes the images to obtain the locations of the finger or objects. Based on the motions or a movement pattern (gesture) of the finger or objects, the processor produces the multi-touch information for controlling a computing device and associated displays.

13 Claims, 12 Drawing Sheets

(56) References Cited

U.S. PATENT DOCUMENTS

| | | |
|---|---|---|
| 2002/0060669 A1* | 5/2002 | Sze ................... 345/173 |
| 2003/0063775 A1* | 4/2003 | Rafii et al. ............. 382/106 |
| 2003/0165048 A1* | 9/2003 | Bamji et al. ............ 361/681 |
| 2003/0174125 A1* | 9/2003 | Torunoglu et al. ...... 345/168 |
| 2008/0179507 A2 | 7/2008 | Han ..................... 250/224 |
| 2008/0297482 A1 | 12/2008 | Weiss .................... 345/173 |
| 2009/0006292 A1 | 1/2009 | Block .................... 706/20 |
| 2009/0251425 A1 | 10/2009 | Sohn et al. ............. 345/173 |
| 2009/0273668 A1 | 11/2009 | Mirtich et al. |
| 2009/0295730 A1 | 12/2009 | Shin et al. |
| 2010/0079397 A1 | 4/2010 | Yang et al. |
| 2010/0177035 A1 | 7/2010 | Schowengerdt et al. |
| 2010/0231522 A1* | 9/2010 | Li ........................ 345/169 |
| 2011/0025629 A1* | 2/2011 | Grivna et al. ........... 345/173 |
| 2011/0205186 A1 | 8/2011 | Newton et al. |
| 2011/0221684 A1 | 9/2011 | Rydenhag |
| 2011/0285632 A1 | 11/2011 | Arai |
| 2011/0291986 A1 | 12/2011 | Rebeschi et al. |
| 2012/0044149 A1 | 2/2012 | Son et al. |
| 2012/0075253 A1 | 3/2012 | Tsai et al. |
| 2012/0262423 A1* | 10/2012 | Su et al. ................ 345/175 |
| 2014/0055364 A1* | 2/2014 | Sze et al. ............... 345/169 |

\* cited by examiner

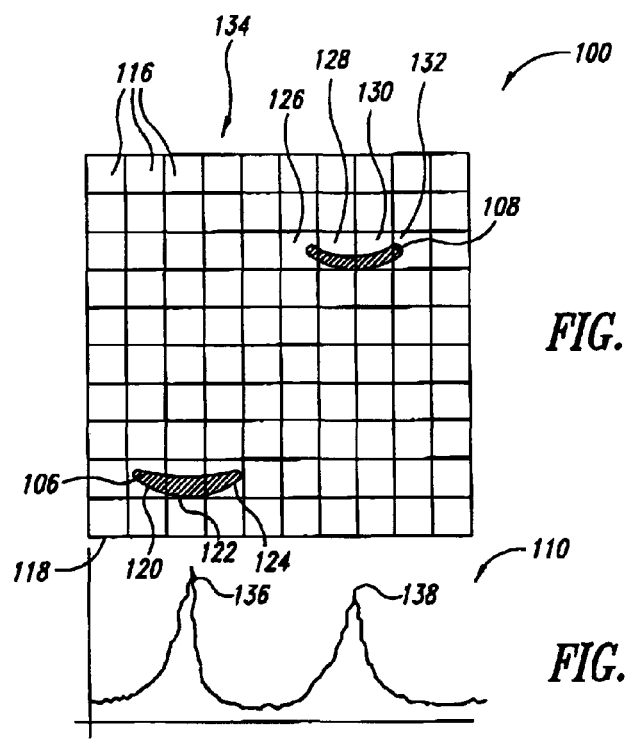
FIG. 2A
FIG. 2B
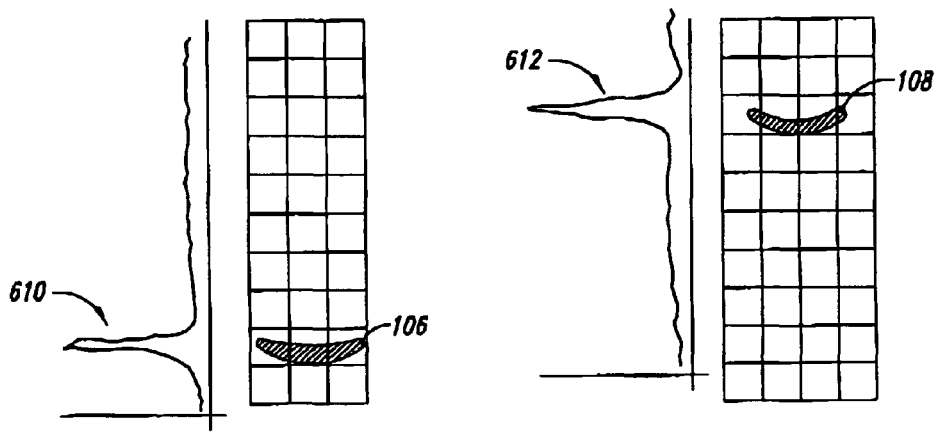
FIG. 2D  FIG. 2C    FIG. 2F  FIG. 2E

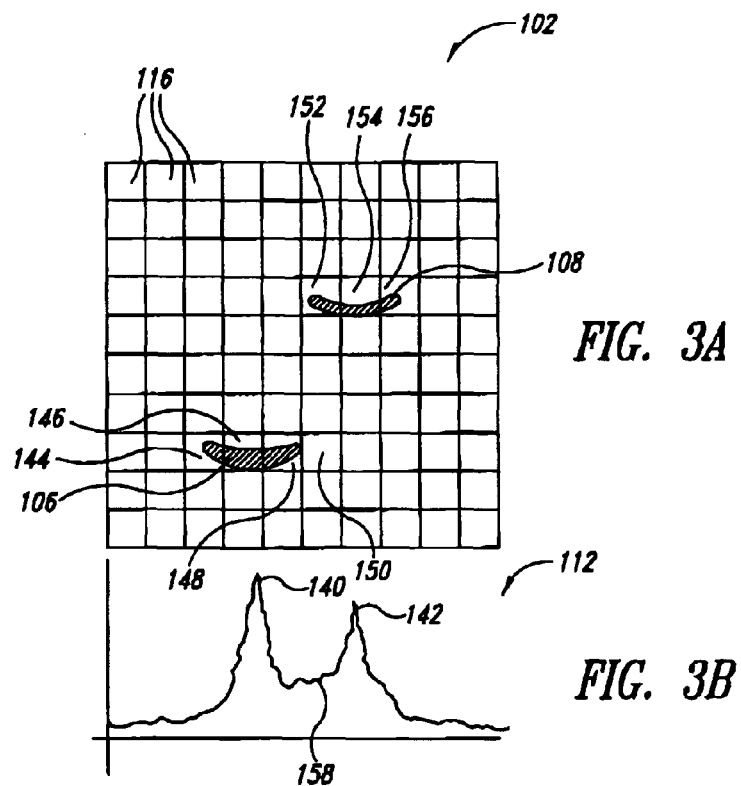
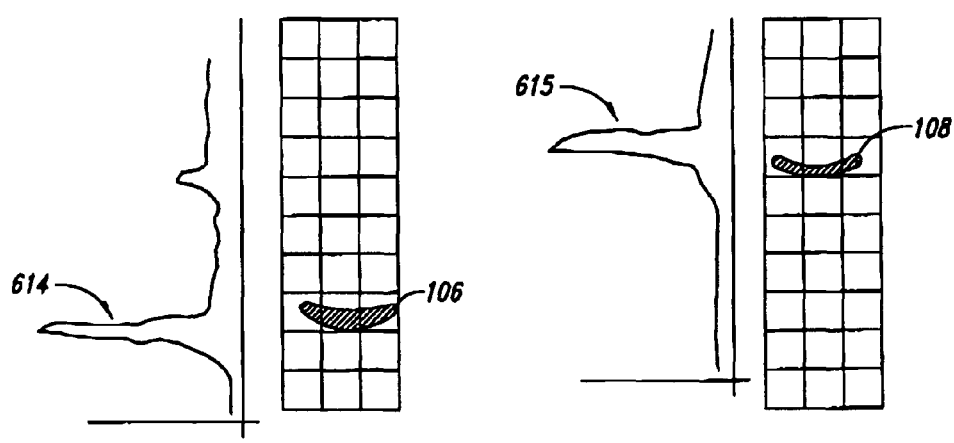
FIG. 3D  FIG. 3C       FIG. 3F  FIG. 3E

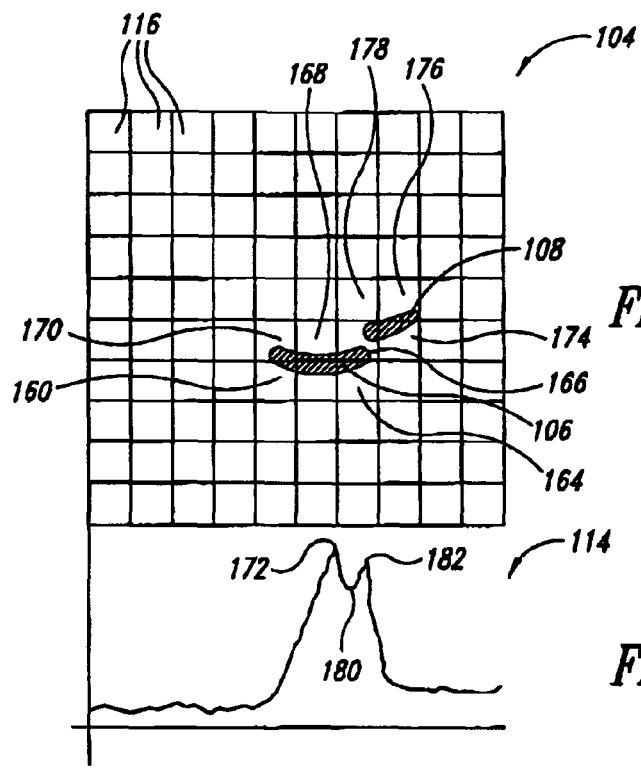
*FIG. 4A*
*FIG. 4B*
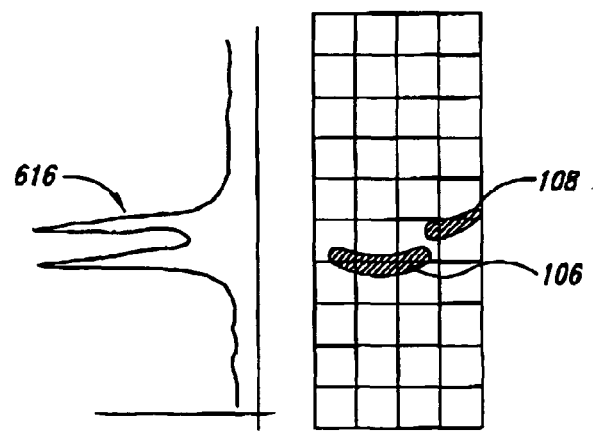
*FIG. 4D*  *FIG. 4C*

| | 1 | 2 | 3 | 4 | 5 | 6 | 7 | 8 | ... | 633 | 634 | 635 | 636 | 637 | 638 | 639 | 640 |
|---|---|---|---|---|---|---|---|---|---|---|---|---|---|---|---|---|---|
| 1 | 376 | 376 | 376 | 376 | 376 | 376 | 376 | 376 | | 376 | 376 | 376 | 376 | 376 | 376 | 376 | 376 |
| 2 | 377 | 377 | 377 | 377 | 377 | 377 | 377 | 377 | | 377 | 377 | 377 | 377 | 377 | 377 | 377 | 377 |
| 3 | 378 | 378 | 378 | 378 | 378 | 378 | 378 | 378 | | 378 | 378 | 378 | 378 | 378 | 378 | 378 | 378 |
| 4 | 380 | 380 | 380 | 380 | 380 | 380 | 380 | 380 | | 380 | 380 | 380 | 380 | 380 | 380 | 380 | 380 |
| 5 | 381 | 381 | 381 | 381 | 381 | 381 | 381 | 381 | | 381 | 381 | 381 | 381 | 381 | 381 | 381 | 381 |
| 6 | 382 | 382 | 382 | 382 | 382 | 382 | 382 | 382 | | 382 | 382 | 382 | 382 | 382 | 382 | 382 | 382 |
| 7 | 384 | 384 | 384 | 384 | 384 | 384 | 384 | 384 | | 384 | 384 | 384 | 384 | 384 | 384 | 384 | 384 |
| 8 | 385 | 385 | 385 | 385 | 385 | 385 | 385 | 385 | | 385 | 385 | 385 | 385 | 385 | 385 | 385 | 385 |
| ... | | | | | | | | | | | | | | | | | |
| 236 | 1655 | 1655 | 1655 | 1655 | 1655 | 1655 | 1655 | 1655 | | 1655 | 1655 | 1655 | 1655 | 1655 | 1655 | 1655 | 1655 |
| 237 | 1677 | 1677 | 1677 | 1677 | 1677 | 1677 | 1677 | 1677 | | 1677 | 1677 | 1677 | 1677 | 1677 | 1677 | 1677 | 1677 |
| 238 | 1700 | 1700 | 1700 | 1700 | 1700 | 1700 | 1700 | 1700 | | 1700 | 1700 | 1700 | 1700 | 1700 | 1700 | 1700 | 1700 |
| 239 | 1723 | 1723 | 1723 | 1723 | 1723 | 1723 | 1723 | 1723 | | 1723 | 1723 | 1723 | 1723 | 1723 | 1723 | 1723 | 1723 |
| 240 | 1747 | 1747 | 1747 | 1747 | 1747 | 1747 | 1747 | 1747 | | 1747 | 1747 | 1747 | 1747 | 1747 | 1747 | 1747 | 1747 |
| 241 | 1771 | 1771 | 1771 | 1771 | 1771 | 1771 | 1771 | 1771 | | 1771 | 1771 | 1771 | 1771 | 1771 | 1771 | 1771 | 1771 |
| 242 | 1796 | 1796 | 1796 | 1796 | 1796 | 1796 | 1796 | 1796 | | 1796 | 1796 | 1796 | 1796 | 1796 | 1796 | 1796 | 1796 |
| 243 | 1822 | 1822 | 1822 | 1822 | 1822 | 1822 | 1822 | 1822 | | 1822 | 1822 | 1822 | 1822 | 1822 | 1822 | 1822 | 1822 |
| ... | | | | | | | | | | | | | | | | | |
| 473 | 5995 | 5995 | 5995 | 5995 | 5995 | 5995 | 5995 | 5995 | | 5995 | 5995 | 5995 | 5995 | 5995 | 5995 | 5995 | 5995 |
| 474 | 5995 | 5995 | 5995 | 5995 | 5995 | 5995 | 5995 | 5995 | | 5995 | 5995 | 5995 | 5995 | 5995 | 5995 | 5995 | 5995 |
| 475 | 5995 | 5995 | 5995 | 5995 | 5995 | 5995 | 5995 | 5995 | | 5995 | 5995 | 5995 | 5995 | 5995 | 5995 | 5995 | 5995 |
| 476 | 5995 | 5995 | 5995 | 5995 | 5995 | 5995 | 5995 | 5995 | | 5995 | 5995 | 5995 | 5995 | 5995 | 5995 | 5995 | 5995 |
| 477 | 5995 | 5995 | 5995 | 5995 | 5995 | 5995 | 5995 | 5995 | | 5995 | 5995 | 5995 | 5995 | 5995 | 5995 | 5995 | 5995 |
| 478 | 5995 | 5995 | 5995 | 5995 | 5995 | 5995 | 5995 | 5995 | | 5995 | 5995 | 5995 | 5995 | 5995 | 5995 | 5995 | 5995 |
| 479 | 5995 | 5995 | 5995 | 5995 | 5995 | 5995 | 5995 | 5995 | | 5995 | 5995 | 5995 | 5995 | 5995 | 5995 | 5995 | 5995 |
| 480 | 5995 | 5995 | 5995 | 5995 | 5995 | 5995 | 5995 | 5995 | | 5995 | 5995 | 5995 | 5995 | 5995 | 5995 | 5995 | 5995 |

SYSTEM AND METHOD FOR A VIRTUAL MULTI-TOUCH MOUSE AND STYLUS APPARATUS

CROSS-REFERENCE TO RELATED APPLICATIONS

This application claims the benefit under 35 U.S.C. §119 (e) of U.S. Application No. 61/292,653, filed Jan. 6, 2010, which application is incorporated by reference in its entirety.

BACKGROUND

1. Technical Field

The present disclosure is directed to detecting the presence and positioning of user-controlled objects in an area of interest and, more particularly, to a system and method of optically sensing the presence and movement of an object or objects, such as one or more fingers or a stylus in a virtual working area to virtually control one or more electronic devices.

2. Description of the Related Art

User input devices, such as the ubiquitous computer mouse, have been used for decades as interfaces for computers and other electronic apparatus. Typically, these interface devices provide input signals to the computers via hared wired or wireless connections to control the display of a cursor on a screen. As the user moves the mouse on a surface, corresponding movement of the cursor on the display device is visually perceived. In addition, a user can select displayed items on the screen via positioning of the cursor over the displayed item and actuating one or more switches on the mouse.

With the development of touch-screen interfaces, single-touch and multi-touch input methods have become more common. For example, the user physically taps the touch-screen interface to select an object displayed on the screen. The multi-touch input methods include zoom-in and zoom-out by moving two fingers diagonally away or towards each other, respectively.

With the popularity of the multi-touch inputs, many devices have begun to include multi-touch features. For example, prominent operating systems enable multi-touch user input in association with a variety of electronic devices. Following this trend, many computer and hand held device screens have multi-touch capability. Many of the devices that utilize touch-screens are designed to be portable and easy to use, and as such they often do not include keyboards to minimize device size.

However, many of the applications that are designed to be used on these devices are easier to operate with a separate user input device, such as a mouse or keyboard. Several patents address these separate user input devices. In U.S. Pat. No. 7,215,327 issued to Liu et al. entitled "Device and Method for Generating a Virtual Keyboard/Display," a scanning laser light source having a first laser emitter and a second laser emitter scans a surface to determine a user's movements and selection. The device receives a first and a second reflected beam and determines a time difference for each beam from an initial scanning point to a final scanning point. The device then determines the user's coordinates by comparing the two scan time differences of the first and second reflected beams.

In U.S. Pat. No. 6,710,770 B2 issued to Tomasi et al. entitled "Quasi-three-dimensional Method and Apparatus to Detect and Localize Interaction of User-Object and Virtual Transfer Device" a virtual keyboard and input device is provided. A first light system OS1 projects a beam of light parallel to a surface. A second light system OS2 works with the first light system OS1 to determine a location of an object crossing the beam of light. This patent includes an active triangulation detection method using the first light system OS1 to project the beam and the second light system OS2 as a camera. This patent also includes a passive triangulation method where both the first and second light systems OS1 and OS2 are cameras. Both the active and passive methods use homography to transform an image of an object intersecting the beam to relay the object's actual location in the real world to an associated electronic device. In addition, the cameras OS1 and OS2 can be configured to detect color in order to counteract problems with ambient light.

BRIEF SUMMARY

According to the present disclosure a system and method to detect the presence and movement of an object in an area of interest for use in controlling one or more associated electronic devices is provided.

In accordance with once aspect of the disclosure, an apparatus to obtain a user input from a virtual multi-touch mouse and a virtual stylus is provided. The apparatus is implemented in a housing that includes a light source and an image sensor. The light source is configured to emit a thin fan beam of a specific frequency of light that is located above a surface of interest. The image sensor includes an optical lens and an optical filter configured to continuously collect images within a virtual working area above the surface of interest. The apparatus also includes a processor configured to detect from the images the presence and movement of one or more objects in a virtual working area or on a surface of interest. The detection is achieved by averaging each column or row or both column and row of each image and preparing a histogram of the averaged columns and rows. Each histogram is evaluated and calibration tables are utilized to translate the location and movement of the object to an electronic device, such as a cursor on a screen. Each image is compared to the next sequential image to determine if the object is moving and if so how the object is moving, such as a user moving a finger or stylus.

In accordance with another aspect, the apparatus is configured to determine if more than one finger is present in each image. If more than one finger is present, a processor determines if the multiple fingers are performing a multi-touch mouse action or if the stylus is moving. Multi-touch mouse actions include zoom-in, zoom-out, drag, and scroll, to name a few. Other finger movements or stylus movements include writing in cursive or drawing a picture, to name a few.

The challenge is to detect or sense the location of a tip of the finger or the stylus relative to the housing of the apparatus by using a virtual working area on or above a physical working surface. In one embodiment of the present disclosure, the apparatus includes an embedded processor in the housing, the embedded processor coupled to a memory, and a communication unit, where the communication unit is configured to transfer multi-touch mouse events to a companion host device. The communication unit transfers information to the host device wirelessly or is directly connected to the host device.

In another embodiment of the present disclosure, the apparatus includes a communication unit in the housing that is configured to transfer image data to a companion host device that houses the processor. The communication unit transfers image information to the host device wirelessly or is directly connected to the host device. The communication transfers the image information to the host device through any suitable communication method including wired USB, wireless USB, or Bluetooth, to name a few.

In an alternative embodiment, the apparatus is configured to obtain the user's input from a virtual stylus.

In accordance with another aspect of the present disclosure, a method is provided that includes detecting at least one object breaking a plane of light in a working area, capturing a plurality of images of the at least one object breaking the plane of light in the working area, each image of the plurality of images having a plurality of pixels in rows and columns, generating a column histogram of each image by averaging pixel intensity values for each column of pixels, determining at least one span of contiguous columns of average pixel intensity values that exceed a threshold column average pixel intensity value, determining at least one spike of average pixel intensity values in the span of contiguous columns, generating a row histogram of each image by averaging pixel intensity values for each row of pixels, determining at least one span of contiguous rows of average pixel intensity values that exceed a threshold row average pixel intensity value, determining at least one spike of average pixel intensity values in the span of contiguous rows, and determining coordinates of the at least one object breaking the plane of light in the working area from the at least one spike of average intensity values in the span of contiguous columns and the at least one spike of average intensity values in the span of contiguous rows.

In accordance with another aspect of the present disclosure, the method includes determining a center point of the at least one object in the working area by determining a center column in the span of contiguous columns and determining a center row in the span of contiguous rows for each at least one object. Determining the center of the span of contiguous columns and the center of the span of contiguous rows can be accomplished by determining the total number of columns in the span of contiguous columns and dividing the total number of columns by two and determining the total number of rows in the span of contiguous rows and dividing the total number of rows by two, respectively.

In accordance with a further aspect of the present disclosure, determining if multiple objects are in the working area can be accomplished by determining if there is more than one spike of average pixel intensity values in the span of contiguous columns or more than one spike of average pixel intensity values in the span of contiguous rows. It can also be done by determining whether the span of contiguous columns is greater than a threshold span of contiguous columns or determining whether a span of contiguous rows is greater than a threshold span of contiguous rows.

A system formed in accordance with the present disclosure can be structured to accomplish the foregoing method. For example, a system for use with at least one object is provided that includes a virtual mouse device that includes:

- a light source mounted in a housing, the light source structured to continuously emit or pulse a thin fan beam of a specific frequency of light above a surface of interest;
- a single sensor mounted in the housing, the single sensor having an optical lens structured to have a field of view that intersects the thin fan beam of light to define a virtual working area, and an optical filter, the sensor structured to detect at least one object breaking the thin fan beam of light in the working area and to capture a plurality of images of the at least one object in the working area, each image of the plurality of images having a plurality of pixels in rows and columns.

The system further includes a processor structured to generate a column histogram of each image by averaging pixel intensity values for each column of pixels, determine at least one span of contiguous columns of average pixel intensity values that exceed a threshold column average pixel intensity value, determine at least one spike of average pixel intensity values in the span of contiguous columns, generate a row histogram of each image by averaging pixel intensity values for each row of pixels, determine at least one span on contiguous rows of average pixel intensity values that exceed a threshold row average pixel intensity value, determine at least one spike of average pixel intensity values in the span of contiguous rows, determine coordinates of the at least one object breaking the plane of light in the working area from the at least one spike of average intensity values in the span of contiguous columns and the at least one spike of average intensity values in the span of contiguous rows, and to generate an output signal in response to the detection of the at least one object in the working area. The processor can be formed as part of the virtual mouse device or in conjunction with another device in the system, such as the communication unit.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein:

FIGS. 2A-2F, 3A-3F, and 4A-4D are images and histograms of a finger and fingers in an area of interest in accordance with an embodiment of the present disclosure.

FIG. 8 is an X axis calibration table in accordance with one embodiment of the present disclosure.

FIG. 9 is a Y axis calibration table in accordance with one embodiment of the present disclosure.

DETAILED DESCRIPTION

Figure 1A:
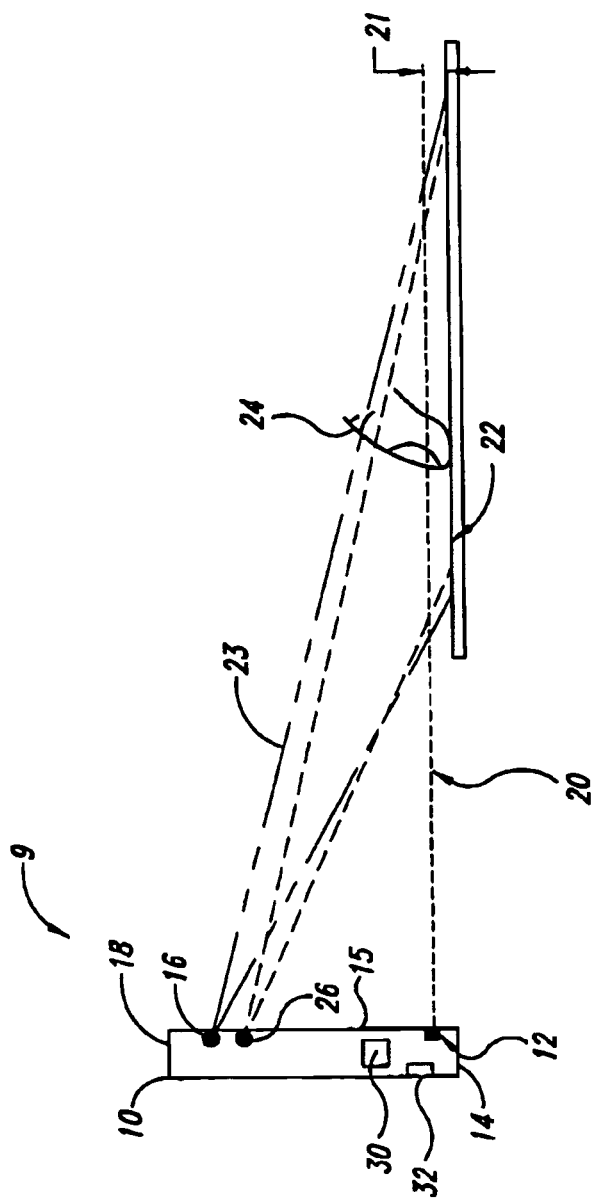
FIG. 1A is a side view of a virtual multi-touch input system in accordance with one aspect of the present disclosure.

In the following description, certain specific details are set forth in order to provide a thorough understanding of various embodiments of the disclosure. However, one skilled in the art will understand that the disclosure may be practiced without these specific details. In other instances, well-known structures associated with sensors and image projection have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to." In addition, the term "grid tied" will be used synonymously with "grid tie" throughout this specification.

In addition, reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale. For example, the shapes of various features are not drawn to scale, and some of these features are enlarged and positioned to improve drawing legibility.

The headings herein are for convenience only and do not interpret the scope or meaning of the embodiments.

Referring initially to FIG. 1A, shown therein is a side view of a virtual multi-touch mouse apparatus 9 having a housing 10 that includes a light source unit 12 located adjacent a bottom 14 and front 15 of the housing 10 and a sensor system 16 located adjacent a top 18 and the front 15 of the housing 10. The light source unit 12 is structured and positioned to emit a thin fan beam of light 20 out the front 15 of the housing 10 and in a direction that is parallel and close to a working surface 22. The sensor system 16 is angled to look down at and to acquire data from the beam of light 20 over the working surface 22.

For purposes of the present disclosure, the working surface 22 is a two-dimensional area defined by a physical structure below the intersection of the beam of light 20 and the detectable area 23 of the sensor system 16. The working surface 22 includes no sensors or mechanical or electrical components. It may be a table surface, an airplane tray, a piece of paper, or any other suitable surface. The detectable area 23 is the area in which the image sensor system 16 can capture an image of tips of the user's fingers 24 or of other objects, such as the tip of a stylus or a pen. In FIG. 1A a user's finger 24 is shown intersecting the fan beam of the light 20. The user's finger may touch the working surface 22, but it only needs to break the fan beam of light 20 to be detected by the sensor system 16. Hence, while the working surface 22 is defined by the physical structure on which the user places their finger(s) or stylus, the virtual working area is the portion of the fan beam of light 20 that is within the detectable area of the sensor 16.

Figure 1B:
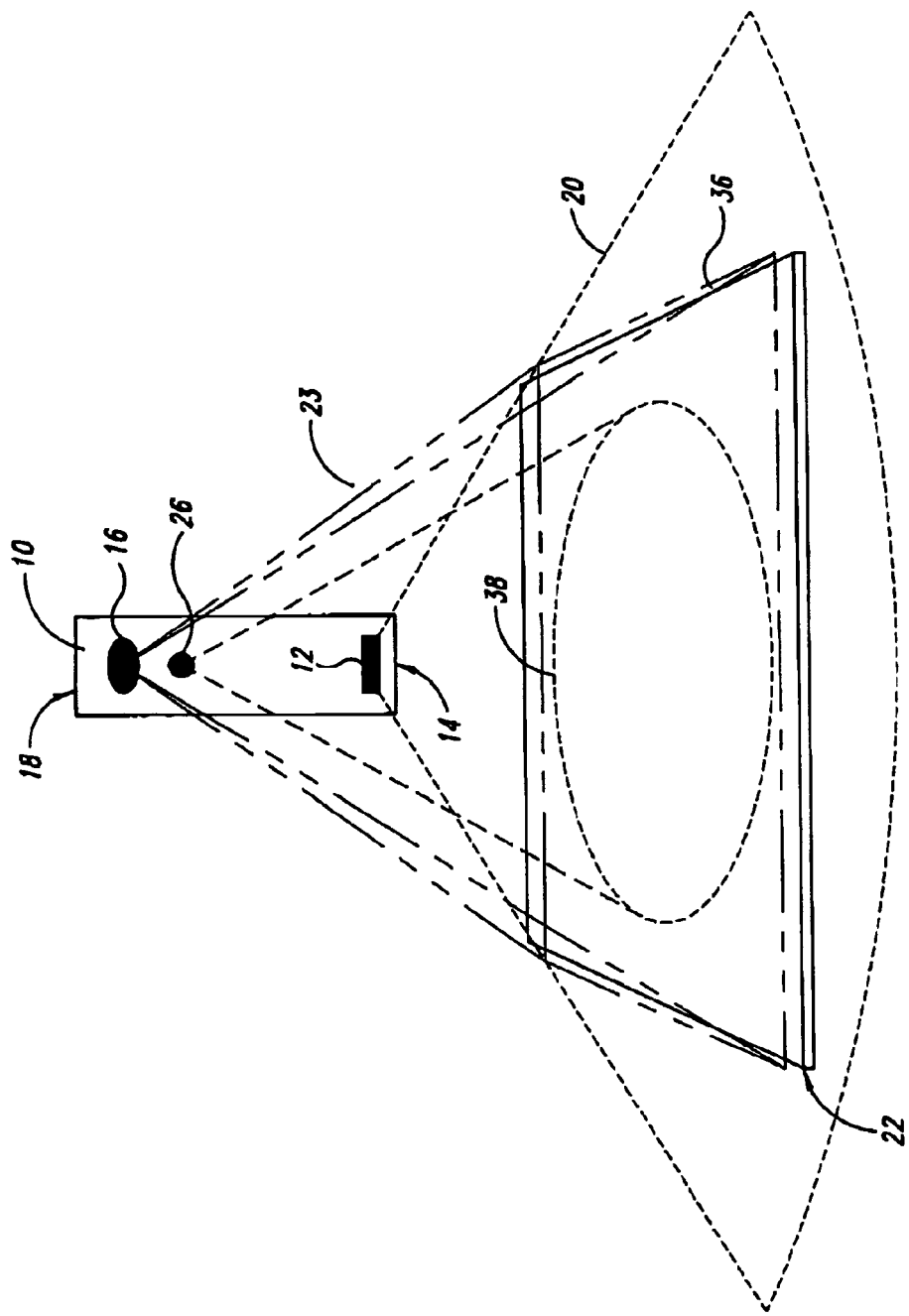
FIG. 1B is an isometric view of the virtual multi-touch input system of FIG. 1A.

FIG. 1B is an isometric view of the front 15 of the housing 10 located behind the working surface 22. Here, the detectable area 23 can be seen intersecting with the fan beam of light 20 to form the virtual working area 36 (in this case a rectangular field of view) above the working surface 22. The sensor system 16 takes images of the field of view in the virtual working area 36, which may be rectangular as shown. Alternatively, the planform shape of the working area 36 may be circular, may match the dimensions of the beam of light 20, or it may be any other geometric or non-geometric shape.

The user uses one or more objects, such as a finger 24 or a stylus, to break the plane of light formed by the beam of light 20 within the working area 36. The sensor system 16 detects the presence of the tip and any movement of the tip or tips in the working area 36. The finger 24 may be moved up and down out of the plane to perform a mouse-click or the finger 24 may be moved as a stylus or a pen to draw or write in the working area 36.

The sensor system 16 is structured to capture a plurality of images 100, 102, 104, such as are shown in FIGS. 2A, 3A, and 4A, to detect locations of the finger or fingers within the working area 36. The images 100, 102, and 104 are an example of three consecutive images of a first finger 106 and a second finger 108 executing a zoom-out movement. The apparatus 9 includes an embedded processor 218 as described below with respect to FIG. 5A or communicates with a processor 211 in a host device 210 as described below with respect to FIG. 5B. The processor 218, 211 evaluates the images for a tip of a finger 24 or a stylus or other object to determine its location relative to the working surface 22. The processor then translates the location of the tip in the field of view 36 to a location on a screen or other display device, such as a monitor, projection screen, or printed onto media such as paper. Movements may be multi-touch mouse movements, lines of a drawing, or cursive or printed writing.

The light source unit 12 projects a thin plane of light or a thin fan beam of light 20 slightly above the working surface 22. In one embodiment, the plane of light 20 is projected parallel to the working surface 22 and spaced from the working surface by a distance 21. In one embodiment, the distance 21 is in the range of 5 and 10 mm. However, the plane of light 20 may be projected at other angles for non-standard working surfaces, i.e., uneven, irregular, or angled working surfaces. The light source unit 12 may be an LED, a laser, or other light source capable of projecting a specific wavelength of light into the thin fan beam of light 20. Ideally, the beam of light 20 is in the range of 0.1 mm and 0.5 mm, and preferably in the range of 0.1 mm and 0.3 mm. The beam of light 20 is emitted at an intensity sufficient for illuminating the finger 24 when in the plane of the beam of light 20. The light can be of any frequency and is preferably in the invisible light range; i.e., the infra-red (IR) spectrum is a preferred choice, having a frequency in the range of 1 to and including 430 THz.

In an alternative embodiment, the light source unit 12 emits the beam of light 20 in pulses. Emitting the beam of light 20 in pulses has the advantage of saving power over a continuous emission of the beam of light 20. For example, if the light source unit 12 emits pulses of light at a frequency of 30 Hz with a duty cycle of 50%, the light source unit 12 will only be on half of the time it would have been on otherwise. The additional power efficiency can be utilized to extend battery life, or the power savings can be converted to an increase in the intensity of the beam of light 20. A greater intensity of the beam of light 20 results in better signal-to-noise ratio characteristics for images captured by the sensor system 16. Increases in signal-to-noise ratio result in greater measurement accuracy and therefore improved precision and performance for the apparatus 9.

The sensor system 16 captures images in the virtual working area 36 and the processor evaluates these images to determine if one or more fingers 24 or a stylus have broken the plane formed by the beam of light 20 in the working area 36. When the user's finger 24 or an object, such as a stylus or pen, intersects the beam of light 20 or touches the surface of interest 22, the light 20 emitted by the light source unit 12 echoes back and is imaged by the sensor system 16. The sensor system 16 has an array of imaging elements including an optical lens and an optical filter. The lens is configured to image the working surface 22 in the field of view of the working area 36, and the optical filter is configured to block ambient light. Preferably, the optical filter is further structured to allow the specific frequency of light emitted from the light source unit 12 and to block all other frequencies of light.

The optical filter is capable of filtering out a substantial portion of light other than the frequency of beam of light 20 emitted from the light source unit 12. The optical filter may be a low pass filter, a high pass filter, or a band pass filter, depending upon the frequency of the beam of light 20. In one embodiment the beam of light 20 is emitted in the infrared frequency range and the optical filter is capable of filtering all but the infrared frequency range of the light spectrum.

The optical filter of the sensor system 16 may also be manufactured into the sensor system 16 to be a component or feature thereof. Many image sensors include a color filter array ("CFA") that is deposited onto the lens of the image sensor during manufacturing prior to the deposition of a micro lens layer. Alternatively, a film of material may be placed over the lens of the image sensor after manufacture to filter all frequencies of light other than the frequency of beam of light 20.

The sensor system 16 is structured to capture a sequence of images of the working surface 22, either as continual discrete images or a continuous stream of images. The processor, whether embedded or in the host system, evaluates each image to determine if a finger 24 or stylus has crossed the plane of the beam of light 20. The evaluation of the images will be described in more detail below.

The sensor system 16 may be a CCD or CMOS image sensor in a variety of resolutions in accordance with one embodiment of the present disclosure. Such image sensors can include hundreds of thousands to millions of pixels in each image where the pixels are arranged in a matrix of rows and columns. In one embodiment, the sensor system 16 is implemented with a relatively low resolution image sensor, such as readily commercially available sensors that will not be described in detail herein. For example, the sensor system 16 may be a VGA image sensor, i.e. one having 640 columns and 480 rows of pixels. As another example, the sensor system 16 may be a CIF image sensor having 352 columns by 288 rows of pixels. However, the sensor system 16 may be implemented with any suitable image sensor of higher or lower resolutions than those discussed herein.

In one embodiment, the apparatus 9 may include a low power movement detection device that sends a signal to the light system 12 and the sensor system 16 when movement has been detected. This is for a power saving mode, such that if there is no movement in the field of view 36 for a selected time period the light system 12 and the sensor system 16 will go into sleep mode. Once a movement is detected, the light system 12 projects the fan beam of light and the sensor system 16 begins capturing images.

The sensor system 16 may be configured to capture images at a particular frequency. In one embodiment, the sensor system 16 captures images at 30 frames per second. The frequency at which images are captured may be selected to save power by only taking an image once movement has been detected in the working surface.

In one embodiment, the sensor system 16 synchronizes the image capturing with the pulses of the light source unit 12. For example, if the fan beam of light 20 is pulsed to be on for 1 millisecond a shutter of the image sensor of the sensor system 16 is opened for 3 milliseconds. The shutter may be opened for 1 millisecond before the light is pulsed and for 1 millisecond after the pulse in order to accurately capture any tip or tips of fingers or stylus. As mentioned above, pulsing the beam of light 20 allows more power to be used per beam resulting in stronger beams of light 20. With more intense beams of light 20, reflections or otherwise illuminated tips are more defined in the images.

The frequency of the pulse of the beam of light 20 may be determined by the specifications of the image sensor 16. For example, the beam of light 20 is pulsed at 30 Hertz if the image sensor 16 is configured to capture 30 frames per second. Some image sensors 16 include pins, often referred to as strobe output pins, which may be used to synchronize the pulse of the beam of light 20 with the image capture of the sensor system 16. The strobe output pin may signal the light source unit 12 to begin emitting the beam of light 20 before the sensor system 16 captures an image as well as some time after the sensor system 16 is scheduled to capture an image, so as to maximize the light available to illuminate the user's finger 24.

If the sensor system 16 is incorrectly synchronized with the light source system 12, the apparatus 9 may not accurately detect the presence of the finger 24. In order to avoid such detection errors, the pulses from the light source unit 12 may be at a frequency that is a least two times the capture frequency of the sensor system 16, which is in accordance with the Nyquist theorem.

The apparatus 9 may include a power button 30 to enable a user to control the operational state or mode of the apparatus 9. Additionally the power button 30 may be used to connect the apparatus 9 to a host device through a communication protocol such as Bluetooth. For example, two presses of the power button 30 may indicate that the apparatus 9 is to enable its internal Bluetooth radio. Furthermore the apparatus 9 may use the power button 32 enter a low-power standby mode from which the apparatus 9 may recover more quickly from a sleep mode. For example a user may press the power button three times to enter a low-power standby or sleep mode. Alternatively, the apparatus 9 may be programmed so that the power button 30 may be pressed and held for a number of seconds to result in entering low-power standby mode.

The housing 10 may also include a communication port 32 to provide alternative modes of connection between the apparatus 9 and the host device. For example the communication port 32 may be a USB port, a FireWire port, a mini USB port, or the like. The apparatus 9 may be configured so that upon connection to a host through the communication port 32, the apparatus 9 turns off any wireless communication radios or and any batteries internal to the apparatus 9. The apparatus 9 may also automatically go into a recharge mode when directly connected to the host device through the communication port 32.

The housing 10 may include a light 26 that is configured to project a visible light pattern 38 onto the working surface 22. The light pattern 38 provides the user with a visual indication of boundaries of the working area 36 to aid the user in staying within the bounds of the working area and ensure their virtual mouse movements are detected. The light pattern 38 may be produced by an LED, an incandescent light, or the like. Additionally, an intensity of the light 26 may be increased or decreased to an intensity deemed suitable by user.

In one embodiment, the light 26 is positioned to illuminate a portion of the working surface 22. The light 26 may provide no other function than to indicate to a user the approximate area in which movements may be detectible by the sensor system 16. In one embodiment, the light 16 is set to a frequency of light commensurate with that of the light source unit 12 and is configured to enhance the reflections from the user's finger 24. Although the light 26 is illustrated as being below the sensor system 16, the light 26 may be positioned above or lateral to the sensor system 16. According to one embodiment, the light 26 may include multiple lights which may be positioned so as to create an aesthetically pleasing design on, around, or proximate to the apparatus 9.

Once at least one of the user's fingers or stylus breaks the plane of the beam of light 20, the multi-touch input apparatus 9 begins the process of determining a location of the finger tip. The finger tip 24 is illuminated by the beam of light 20 when the it breaks the plane or touches the working surface 22. The finger does not have to touch the working surface 22; instead, the finger 24 need only break the plane of the beam of light 22. The distance above the working surface 22 of beam of light 20 may be increased to allow the user to place a low friction pad, such as one filled with liquid or gel, a pad of paper, or other alternative surface on the working surface 22 to facilitate smooth movement of the user's finger 24 or stylus without interfering unintentionally with the beam of light 20.

FIGS. 2A, 3A, and 4A are a simplified example of a series of consecutive images 100, 102, and 104 taken by the sensor system 16 during a multi-touch action of zooming-out. FIGS. 2B, 3B, and 4B are a series of column histograms 110, 112, and 114 of the images 100, 102, and 104, respectively, generated by the processor 218, 211. FIGS. 2C and 2E are images taken of the same objects in FIG. 2A and processed to produce row histograms 610, 612, in FIGS. 2D and 2F, respectively. Likewise, FIGS. 3C and 3E are images of the same objects in FIG. 3A with corresponding row histograms 614 and 615 in FIGS. 3D and 3F, respectively. FIG. 4C is an image of the two objects from FIG. 4A and accompanying row histogram 616.

The images 100, 102, and 104 are illustrated as 10 by 10 arrays of pixels 116 for ease of illustration. In reality, each image could have hundreds of thousands of pixels 116. FIG. 2A is the first image 100 taken by the sensor system 16 as the first and second fingers 106, 108 are illuminated by the fan beam of light 20. The first finger 106 is positioned near a first corner 118 of the first image 106. As the first finger 106 is illuminated, a crescent or curved shape is captured. This crescent or curved shape is generally how a human finger or other curved object, such as a pen or cylindrical stylus, is imaged. If a square object is used, the image will capture a different rectangular shape.

In one embodiment, the image sensor captures the intensity of photons incident upon each pixel 116 in a pixel array. Objects closer to the image sensor 16 will provide a stronger intensity of incidence of photons that is captured by the image sensor than objects located further away from the sensor. The intensity of the photons is measured from the time of the most recent reset, which may be the opening of a shutter over the sensor. The photon intensity is then converted to a voltage. Each pixel in a row of the pixel array may be simultaneously read out. Upon reading every row of the pixel array, the apparatus 9 may calculate the average intensity of every column of the pixel array by summing each pixel in each column. Because the image sensor is capturing filtered reflections of a particular frequency within the field of view or working area 36, a histogram, i.e., a plot of intensity versus column number, indicates columns where a substantial increase in the average intensity of pixels corresponds to reflections from a finger or finger tip.

An increase in average intensity values over several columns within a histogram will appear as a spike or peak value in the histogram. A center point or the center of the spike or peak value or values in the histogram may be determined by measuring a column or row width of each spike that is above a certain threshold of intensity values and determining a number of columns or rows the spike spans. Then, by dividing the number of columns or rows that the spike spans by two, a width in terms of columns or rows from an edge to a center of the spike may be determined. If this width is added to the first or leftmost column of the spike or first or lower column of the spike, a midpoint of the spike can be computed. The midpoint of the spike may be used by the apparatus to indicate a center of the object in the working area 36.

A particular width of the spike can be designated as indicative of a single finger or single object in the filtered view. The apparatus may be programmed to indicate that more than one object or finger is within the working area with either multiple spikes or a spike in the histogram that is greater than a predetermined threshold. For example, if the sensor is a VGA image sensor has 640 columns and 480 rows, and a single object spike has a preset threshold of 30 columns wide, then a histogram spike of 40 columns wide may be registered as two finger tips or two fingers side-by-side. Thus the apparatus may determine that rather than a mouse event, the user is intending to perform a drag event or a flick event, as an example to be described in more detail below.

A row histogram may also be determined, which sums each row of pixels to determine an intensity that can be compared with the column histograms. Similar to the procedure described above with respect to column histograms, the average intensity value of each row may be plotted against the average intensity value of every row in a captured image. The several rows in which the average intensity value is greater than a predetermined threshold value provide an indication of at least one object being in the working area 36 of the sensor system. A center point of a spike in the relevant row histogram may be determined as was described in connection with the column histograms. If multiple spikes exist in the row histogram, the data may be used by the apparatus to determine a particular mouse event executed by the user.

In summary, to improve processor efficiency, only a portion of the images or histograms associated with the images needs to be processed in accordance with the present methodology. In one embodiment, the method includes detecting at least one object breaking a plane of light in a working area, capturing a plurality of images of the at least one object breaking the plane of light in the working area, each image of the plurality of images having a plurality of pixels in rows and columns, generating a column histogram of each image by averaging pixel intensity values for each column of pixels, determining at least one span of contiguous columns of average pixel intensity values that exceed a threshold column average pixel intensity value, determining at least one spike of average pixel intensity values in the span of contiguous columns, generating a row histogram of each image by averaging pixel intensity values for each row of pixels, determining at least one span of contiguous rows of average pixel intensity values that exceed a threshold row average pixel intensity value, determining at least one spike of average pixel intensity values in the span of contiguous rows, and determining coordinates of the at least one object breaking the plane of light in the working area from the at least one spike of average intensity values in the span of contiguous columns and the at least one spike of average intensity values in the span of contiguous rows.

In accordance with another aspect of the present disclosure, the method includes determining a center point of the at least one object in the working area by determining a center column in the span of contiguous columns and determining a center row in the span of contiguous rows for each at least one object. Determining the center of the span of contiguous columns and the center of the span of contiguous rows can be accomplished by determining the total number of columns in the span of contiguous columns and dividing the total number of columns by two and determining the total number of rows in the span of contiguous rows and dividing the total number of rows by two, respectively.

In accordance with a further aspect of the present disclosure, determining if multiple objects are in the working area can be accomplished by determining if there is more than one spike of average pixel intensity values in the span of contiguous columns or more than one spike of average pixel intensity values in the span of contiguous rows. It can also be done by determining whether the span of contiguous columns is greater than a threshold span of contiguous columns or determining whether a span of contiguous rows is greater than a threshold span of contiguous rows.

A system formed in accordance with the present disclosure can be structured to accomplish the foregoing. For example, a system for use with at least one object is provided that includes a virtual mouse device that includes:
  a light source mounted in a housing, the light source structured to continuously emit or pulse a thin fan beam of a specific frequency of light above a surface of interest;
  a single sensor mounted in the housing, the single sensor having an optical lens structured to have a field of view that intersects the thin fan beam of light to define a virtual working area, and an optical filter, the sensor structured to detect at least one object breaking the thin fan beam of light in the working area and to capture a plurality of images of the at least one object in the working area, each image of the plurality of images having a plurality of pixels in rows and columns.

The system further includes a processor structured to generate a column histogram of each image by averaging pixel intensity values for each column of pixels, determine at least one span of contiguous columns of average pixel intensity values that exceed a threshold column average pixel intensity value, determine at least one spike of average pixel intensity values in the span of contiguous columns, generate a row histogram of each image by averaging pixel intensity values for each row of pixels, determine at least one span on contiguous rows of average pixel intensity values that exceed a threshold row average pixel intensity value, determine at least one spike of average pixel intensity values in the span of contiguous rows, determine coordinates of the at least one object breaking the plane of light in the working area from the at least one spike of average intensity values in the span of contiguous columns and the at least one spike of average intensity values in the span of contiguous rows, and to generate an output signal in response to the detection of the at least one object in the working area.

Turning to FIG. 2A, the crescent shape of the first finger 106 is shown extending across three pixels 120, 122, 124. The crescent shape of the first finger 108 is shown extending across four pixels 126, 128, 130, 132. FIG. 2B is the histogram 110 that represents an average value of each column 134 of the array of pixels 116. More particularly, the values in each column 134 of pixels 116 are averaged to determine an average intensity of light per column 134. Alternatively, the columns may be summed, which would result in a similar histogram on a different scale than using the average. In the preferred embodiment an average value is used. The histogram 110 includes two spikes 136, 138 that correspond to the first and second fingers 106, 108.

The intensity of the first spike 136 is greater than the second spike 138 because the crescent shape of the first finger 106 is larger than the crescent shape of the second finger 108. The first spike 138 is aligned with a center of the column that contains the pixel 122, which includes most of the image of the first finger 106. The pixel 122 has the most intensity per pixel in the array of pixels 116. The intensity of the second spike 138 is aligned with a border of two adjacent columns that contain the pixel 128 and the pixel 130, which corresponds to a center portion of the second finger 108.

The zooming-out multi-touch action begins by placing the first and second finger 106, 108 spaced from each other in the plane of the beam of light 20 and continues by moving the first and second fingers 106, 108 towards each other. FIGS. 3A and 4A illustrate an intermediate location and a final location, respectively, of the first and second finger 106, 108 as part of the zooming-out function. FIG. 3B is the second histogram 112 that corresponds to the second image 102 with the first and second fingers in the intermediate location. The second histogram 112 includes two spikes 140, 142 that correspond to centers of the first and second fingers 106, 108. In the second image 102, the first finger 106 spans four pixels 144, 146, 148, 150. A peak of the first spike 140 corresponds to the column that includes the pixel 146. The second finger 108 spans three pixels 152, 154, 156 and the second spike 142 is aligned with the column including the pixel 154. A valley 158 between the two spikes 140, 142 corresponds to the column having both the pixel 150 and the pixel 152, which increases the intensity detected when that column is averaged (or summed).

FIG. 4A is the third image 104 of the final location of the first and second fingers 106, 108. The first and second fingers 106, 108 are shown close together in the third image 104. The first finger 106 is located in six pixels 160, 162, 164, 166, 168, 170. The pixels 160 and 170 are in one column, the pixels 162 and 168 are in a second column, and the pixels 164 and 166 are in a third column. Once each of these columns is averaged or summed the intensity of the first finger 106 is illustrated by a first spike 172 in the third histogram 114 in FIG. 4B.

The second finger 108 is located in four pixels 174, 176, 178, and the pixel 166 that also includes a portion of the first finger 106. The third histogram 114 has a valley 180 that corresponds to the column having the pixel 166, which includes a portion of both the first and the second fingers 106, 108. The third histogram 114 also has a second spike 182 that corresponds to the thickest portion of the second finger 108, which is the largest intensity of light captured by the image sensor.

The crescent produced by imaging the first and second fingers 106, 108 will change in area depending on the user's finger size and a distance from the image sensor. The particular area is not relevant in this disclosure because each column of each image is summed to determine intensity spikes. In addition, if other objects are used, the images will not necessarily be crescent shaped. For example, if a rectangular stylus is used, the image sensor will capture a rectangular representation of the stylus.

The sequence of these three images 100, 102, 104 may be repeated to zoom-out further on a webpage or photograph the user is viewing on the display of the host device.

Another multi-touch input includes a zoom-in function, which is detected when two fingers near each move away from each other while within the working area 36. Other inputs and input movements are described herein below.

In an alternative embodiment, the first and second images 100, 102 may be compared to detect any differences in location of the first and second fingers 106, 108. This may be achieved by subtracting the first image from the second image to determine if the location of the fingers changed. This subtraction method may be used when performing the simpler functions of a pointing device, such as a mouse pointer on a computer, thereby only detecting differences in the location of the user's finger 24.

The images are processed immediately in real time and are then discarded if the software is executed in the embedded processor. If the host or companion device is used to processes the images, the images are transferred or otherwise uploaded to the host system and processed. In either situation, the images are processed in real time.

Because the optical filter blocks almost all the incoming light and only allows the chosen light range to pass through, the pixel values of the image represent the amount of the echoed light. Therefore, there are no R (red), G (green), and B (blue) images. The images generated by the present disclosure are only the intensity images or gray level images. To reduce the ambient light interference, the image may first be subtracted out from a previous collected background image or vice versa. The background image is collected when the device is powered on and the collected images are stable, and it is updated when there is no user activity for a period of time. After background image subtraction, many known image segmentation techniques can be used for detecting one or more fingers or objects. In particular, as described above, a histogram-based method is applied for computation efficiency reasons. After image segmentation, the candidate object(s), e.g., finger(s) or finger tip(s), are indentified, which may then be further screened based on their size.

Figure 5A:
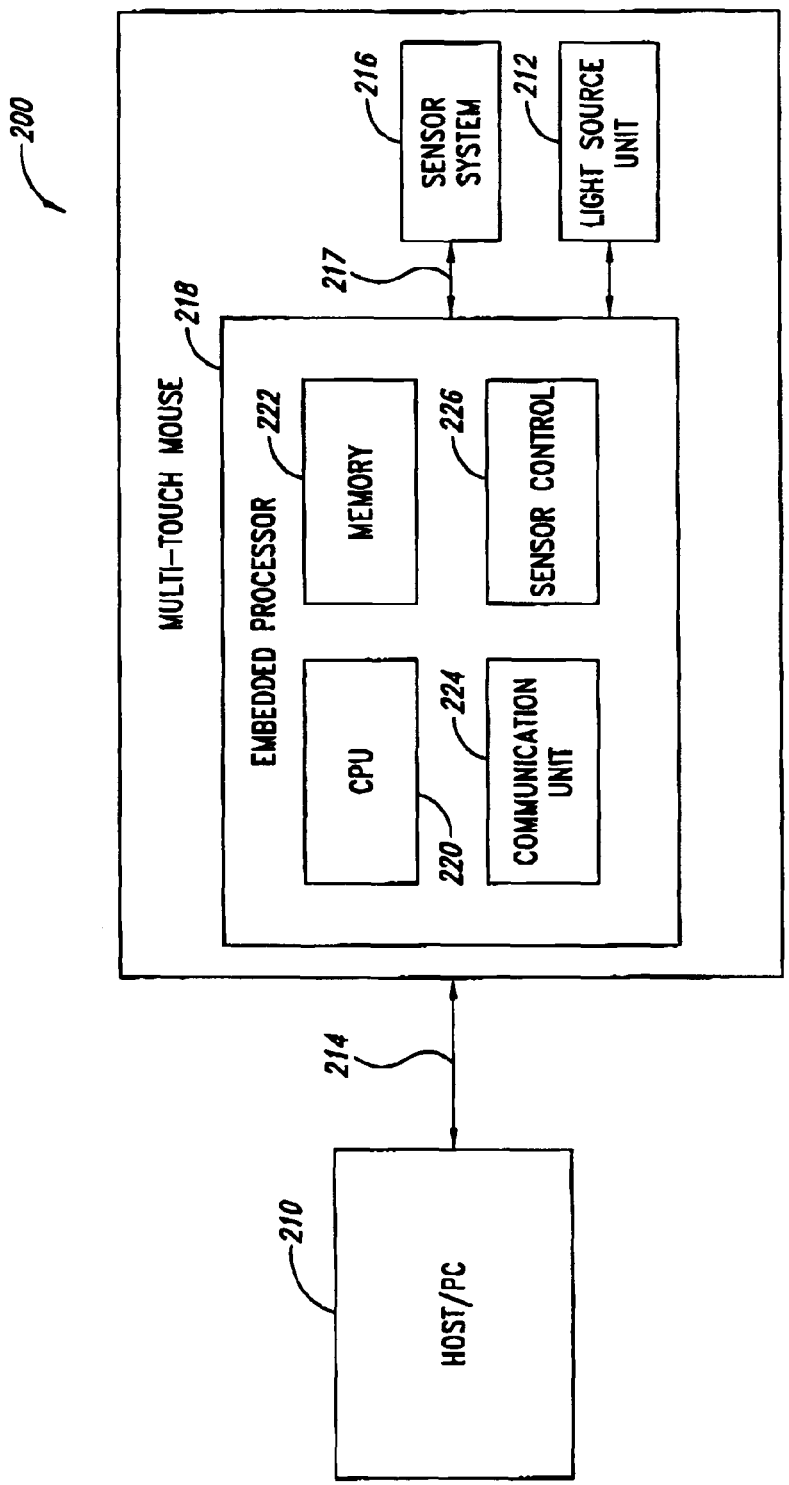
FIG. 5A is a schematic representation of the virtual multi-touch input device having an embedded processor in accordance with one embodiment of the present disclosure.

FIG. 5A is a schematic embodiment of a multi-touch input system that includes an apparatus 200 having an embedded processor 218 that processes image information from a sensor system 216 and communicates with a host device 210. The apparatus 200 is coupled to the host device 210 by a communication link 214. The host 210 may be a computer, a smart phone, a laptop, or other similar electronic device having a screen through which the user interacts with programs. The communication link 214 may be either a wired or wireless connection. The host may control the communication protocol over which data is sent between the host 210 and the apparatus 200. The host 210 may provide battery recharging services through the communication link 214.

The apparatus 200 includes the embedded processor 218, the sensor system 216, the light source unit 212, and a connection 217 between the sensor system 216 and the embedded processor 218. The embedded processor 218 includes a central processing unit CPU 220, a memory 222, a sensor control system 226, and a communication unit 224. The sensor system 216 is electrically coupled to the embedded processor 218 and transmits image information from the working area 36. The embedded processor 218 determines a location of the object, such as the tip of the finger 24, in each image and transmits this location information to the host device 210 so that the host device can display or respond to the user's input. The determination process will be described in more detail below.

The embedded processor 218 utilizes the CPU 220 to perform operations stored in the memory 222, such as image sensor calibration, image correlation, digital signal processing, and conversions of measured data into real life changes in locations. The embedded processor 218 may use the communication unit 224 to receive instructions from the host device 210, to pass instructions to the host device 210, and to transmit data representing changes in location of a user's finger located in the working area 36.

The embedded processor 218 may synchronize the sensor system 216 and the light source unit 212 as discussed above. The embedded processor 218 may control the light source unit 212 to emit a continuous or a pulsed beam of light 20. The apparatus 200 may be configured to rely on the CPU 220 and the memory 222 of the embedded processor 218 while communicating with the host 210 via a wireless connection 214 so as to preserve bandwidth between the host device 10 and the apparatus 200.

Figure 5B:
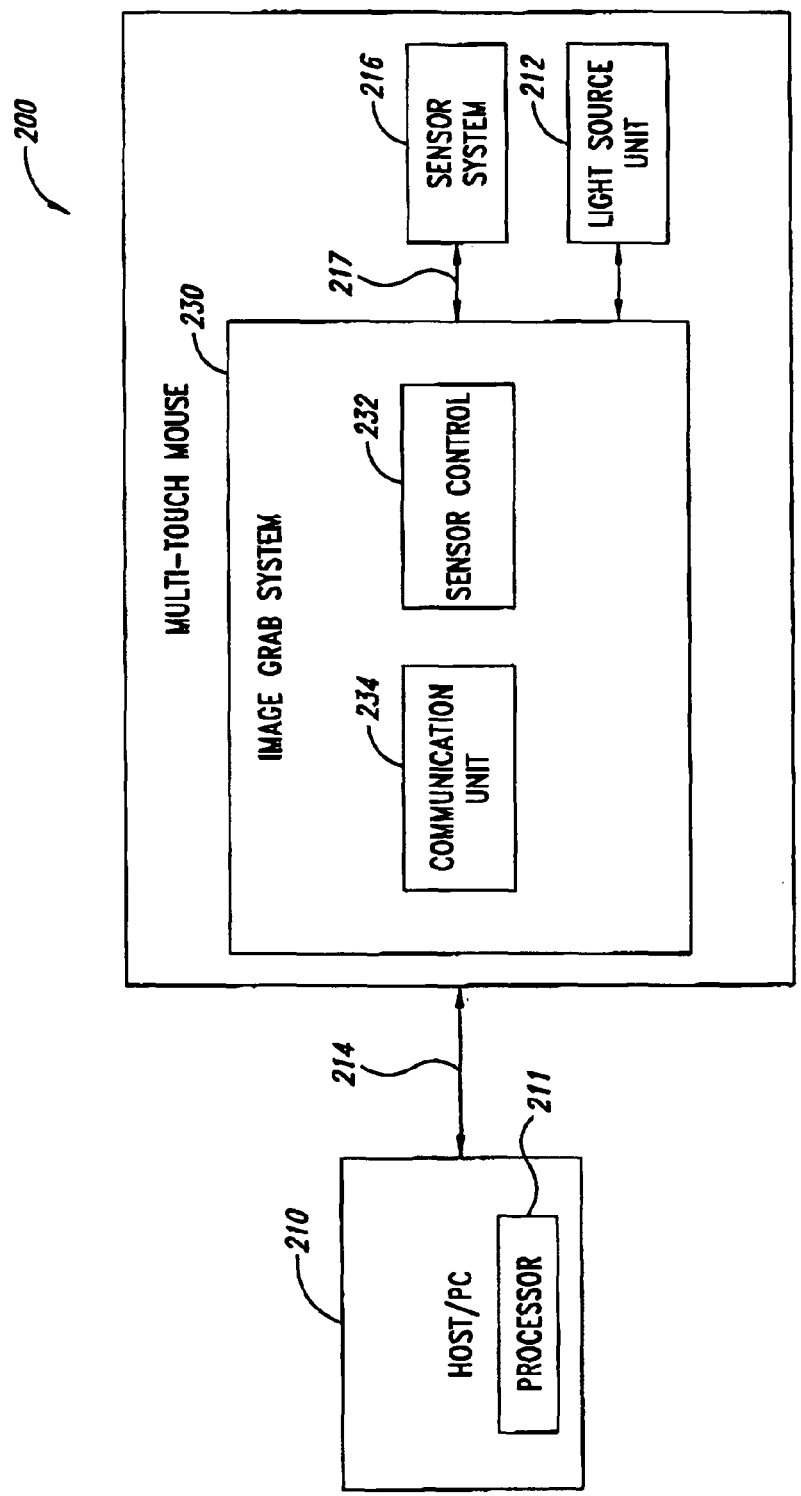
FIG. 5B is a schematic representation of a system having a virtual multi-touch input device coupled to a host device that contains a processor in accordance with another embodiment of the present disclosure.

FIG. 5B is an alternative embodiment of a system using the virtual multi-touch input apparatus 200 where the host device 210 includes a processor 211 configured to process the images collected by the sensor system 216. In this embodiment, the apparatus 200 includes the sensor system 216, the light source unit 212, and an image capture or grab system 230. The image grab system 230 includes a sensor control 232 and a communication unit 234. The image grab system 230 communicates with the sensor system 216 via the connection 217 and to the host device 210 through the communication link 214.

The sensor control 232 may control the sensor system 216. For example, the sensor control 232 may control a length of time the shutter of the image sensor is open. In addition, the sensor control is configured to continue the acquisition of image information from the working area 36 as the communication unit 234 transmits images of the working area 36 and transmits the acquired information to the host device 210 for processing. In one embodiment, the communication link 214 is a hard connection through a wire, such as a USB connection. A wired connection generally provides greater bandwidth, i.e., the ability to transmit and receive more data per second, although the communication link 214 may be wireless.

In an alternative embodiment, the apparatus 200 is configured to work with the embedded processor 218 and the processor 211 in the host device 210. The apparatus 200 is configured to switch between using the embedded processor 218 when the host device is not capable of processing the images and using the processor 211 in the host device 210 when the processor is faster or better equipped to process the images. The apparatus 200 may also rely upon the processor 211 in the host device 210 when the communication link 214 is wired and capable of quick transmission of the image information.

If the apparatus 200 is in a mode that relies on the image grab system 230 in lieu of the embedded processor 218, the apparatus 200 may rely on operational information stored on the host device 210. For example, the host device 210 may store the calibration tables, described in more detail below with respect to FIGS. 8 and 9.

Figure 6:
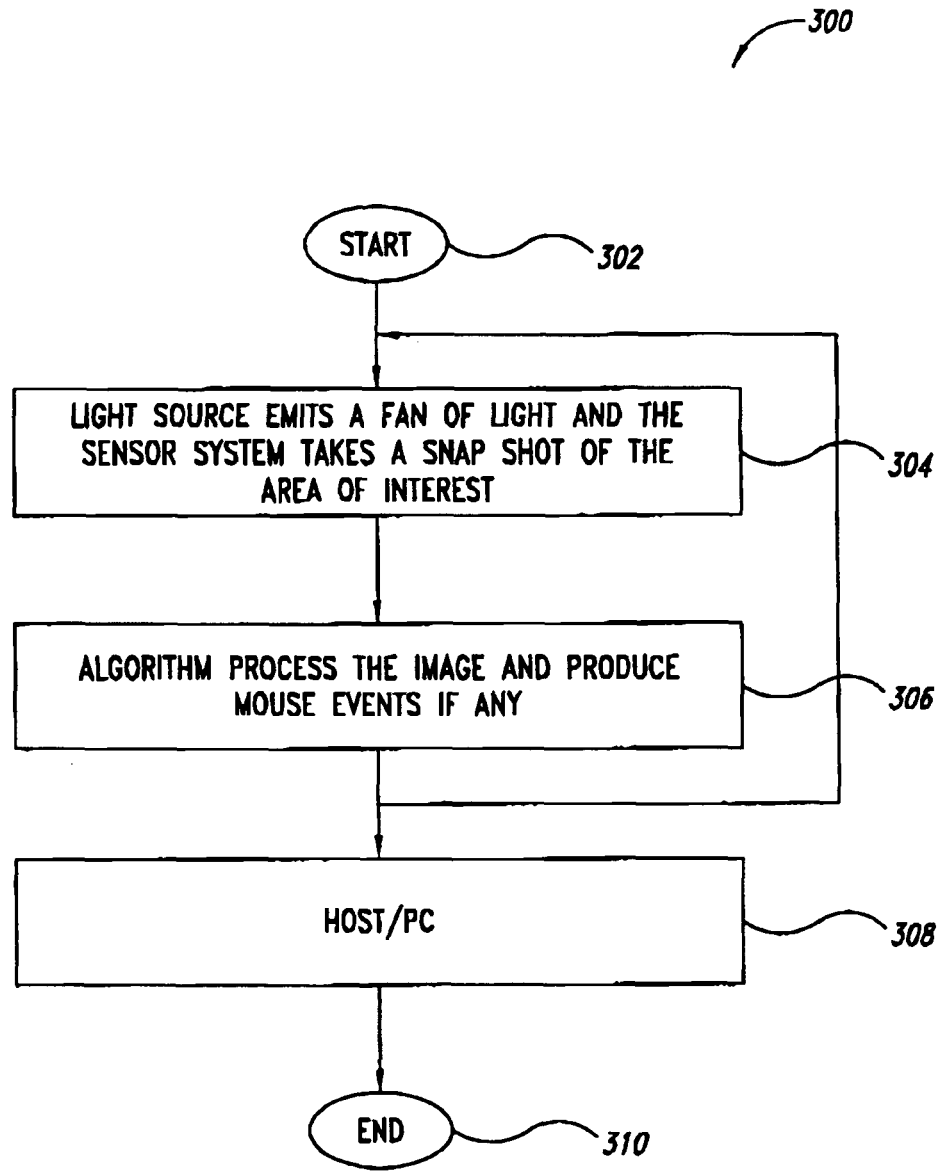
FIG. 6 is a flow chart of a method executed by the virtual multi-touch input system according to an embodiment of the present disclosure.

FIG. 6 is a top level flow chart of a method implemented by the multi-touch input apparatus of FIG. 5A. Once powered on in step 302, the multi-touch input apparatus 9 emits the fan beam of light 20 from the light source unit 12 in step 304. The light source may emit a continuous beam of light or emits pulses of a beam of light while the device is activated. The sensor system 16 continually takes snap shots or images of the working surface 22, also in step 304. In step 306, the processor 211, 218 evaluates the images to determine if an object has broken the plane of the beam of light 20 in the working area. Because the sensor system 16 documents images before, during, and after the event, these images can be compared to determine if a multi-touch input event has occurred. If the processor detects at least one finger or object, the processor evaluates the next images to see what type of event occurred. Once the type of event is determined, the processor translates the information to make a selection or otherwise execute the event, such as altering the display of the host device 210, as illustrated by step 308. If no event is detected, the sensor system continues to take images and the processor continues to evaluate the images for movement or presence of an object in the working area. When a mouse event occurs, the processor communicates with the host device to respond to the mouse event, in step 308.

If the system includes use of a virtual stylus, the processor processes the stylus movements and sends the information to the host device. The host device may have a display screen to display the stylus movements, such as a drawing application or a hand-written notes application.

The apparatus with the embedded processor 218 processes the images in real time as the images are taken by the sensor system 216. More particularly, an algorithm is executed by the processor having the central processing unit (CPU) 220 and the memory 222 in which is stored the software that includes instructions for processing the sequence of images that are provided in real time or from previously stored images. When the embedded processor is used to execute the software, the communication unit 224 is used to send the location and the movement of the user's finger(s), which are considered the virtual mouse-events, to the host system. When using the host to process the images, a communication unit is used to transfer the images and to send control signals to the sensor system 16. Similarly, the communication unit can be wired or wireless.

Figure 7:
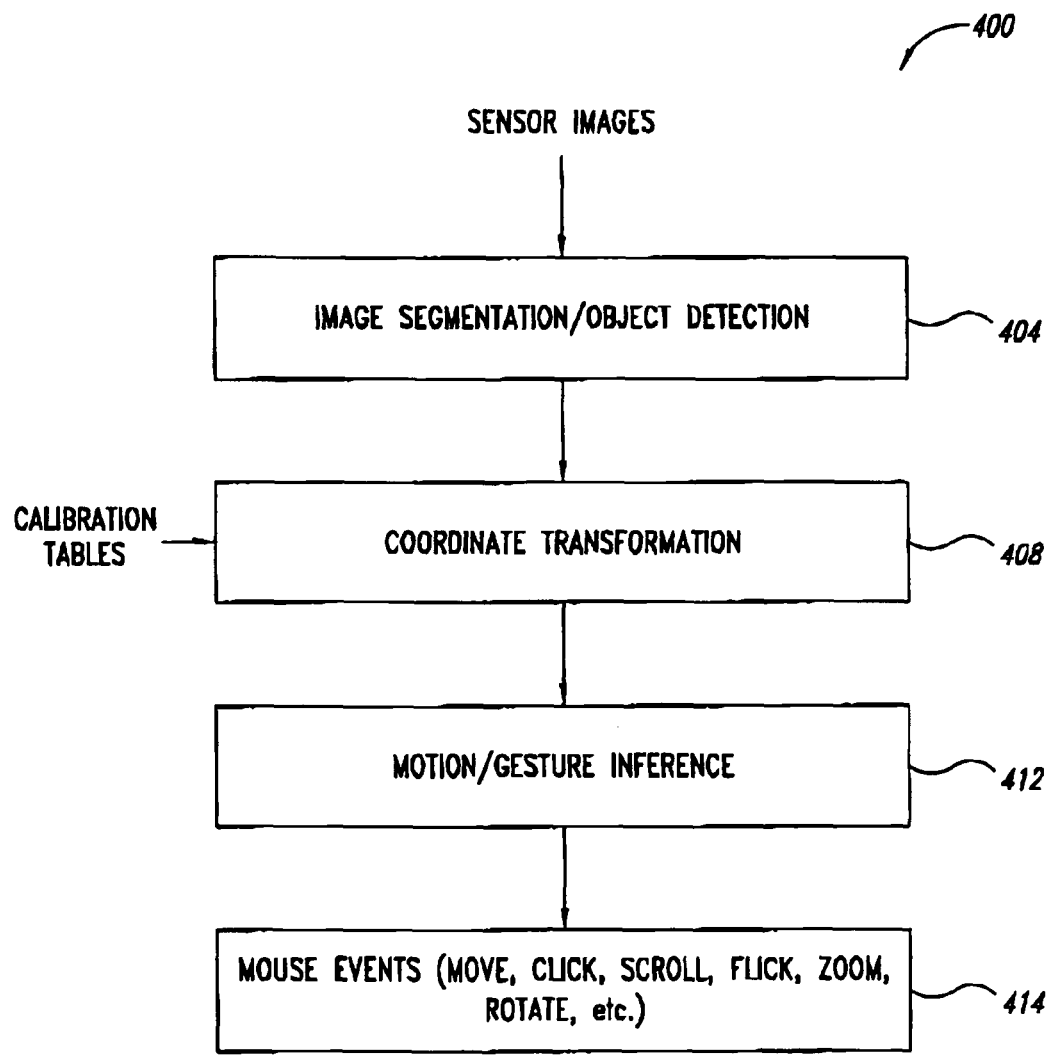
FIG. 7 is a flow chart of a method of detecting a finger or stylus location in accordance with an embodiment of the present disclosure.

FIG. 7 is a flow chart of a process 400 executed by the processor 211, 218 to detect and provide mouse movement information to the host device 210. The process 400 begins with images, such as images 100, 102, 104 of FIGS. 2B, 3B, and 4B. The process 400 includes three modules, an image segmentation and object detection module 404, a coordinate transformation module 408, and a motion or gesture inference module 412. The sensor system 16 sends the image information to the processor 211, 218, which performs the image segmentation and object detection on the series of images that represent related moments in time. The finger(s) 24 present in the series of images are located in the images and can be separated from the background image by optical filtering and other manipulations of the images.

When one image is collected by the sensor system, it is processed by the image segmentation and object detection module 404 where a location of the detected tip or tips is translated into image coordinate (row, column). In one embodiment, the size of the imaged object (in width and height) is determined. The detected location (or size) is then transformed into real world coordinates by the coordinate transformation module 408, which utilizes the calibration tables in FIGS. 8 and 9. The motion and gesture inference module 412 then determines if any multi-touch mouse events occurred based on consecutive images, i.e., the present and past data.

In the coordinate transformation stage, the processor accesses calibration tables 500, 600 and determines real world locations from the object image locations and the calibration tables. Subsequently, the motion and gesture inference module 412 determines if any specific movements that relate to a mouse event have been performed in the series of images.

At 404, the multi-touch input apparatus 9 performs image segmentation and object detection as described above with respect to FIGS. 2A-4B, which may include histogram analysis. At 408, the apparatus may incorporate data included in calibration tables to transform the changes in location of the tip or tips in the working area 36 to physical measurements that may be digitally transferred to the host device's screen, such as a PC or a smart phone. The view captured by the image sensor depends on the angle at which the image sensor is directed toward the working surface as well as the distance between the working surface and the image sensor. For example, the angle of the sensor system, the distance of the sensor system, and the number of pixels within the image sensor system, may determine the distance in the working area represented by each pixel. For example if the field of view of the working area is 64 mm (2.5 inches) wide, side-to-side and 48 mm (1.9 inches) deep, front-to-back and the image sensor is a VGA sensor having 640 columns and 480 rows, then a change in intensity from one pixel to the next would represent 0.1 mm of movement on the working surface. Accordingly, a change in intensity sweeping 100 pixels would represent 10 mm of movement such by the user on the working surface. Depending upon the application, the digital representation of the movement or mouse event captured may be amplified such that 2 mm of movement in the working area (or on the working surface if the system is calibrated to use the working surface dimensions) corresponds to 2 inches of movement on a computer monitor. Alternatively, 2 mm of movement on a working surface may be programmed to correspond to 2 cm of movement on a screen of a smart phone or personal digital assistant.

Figure 8:
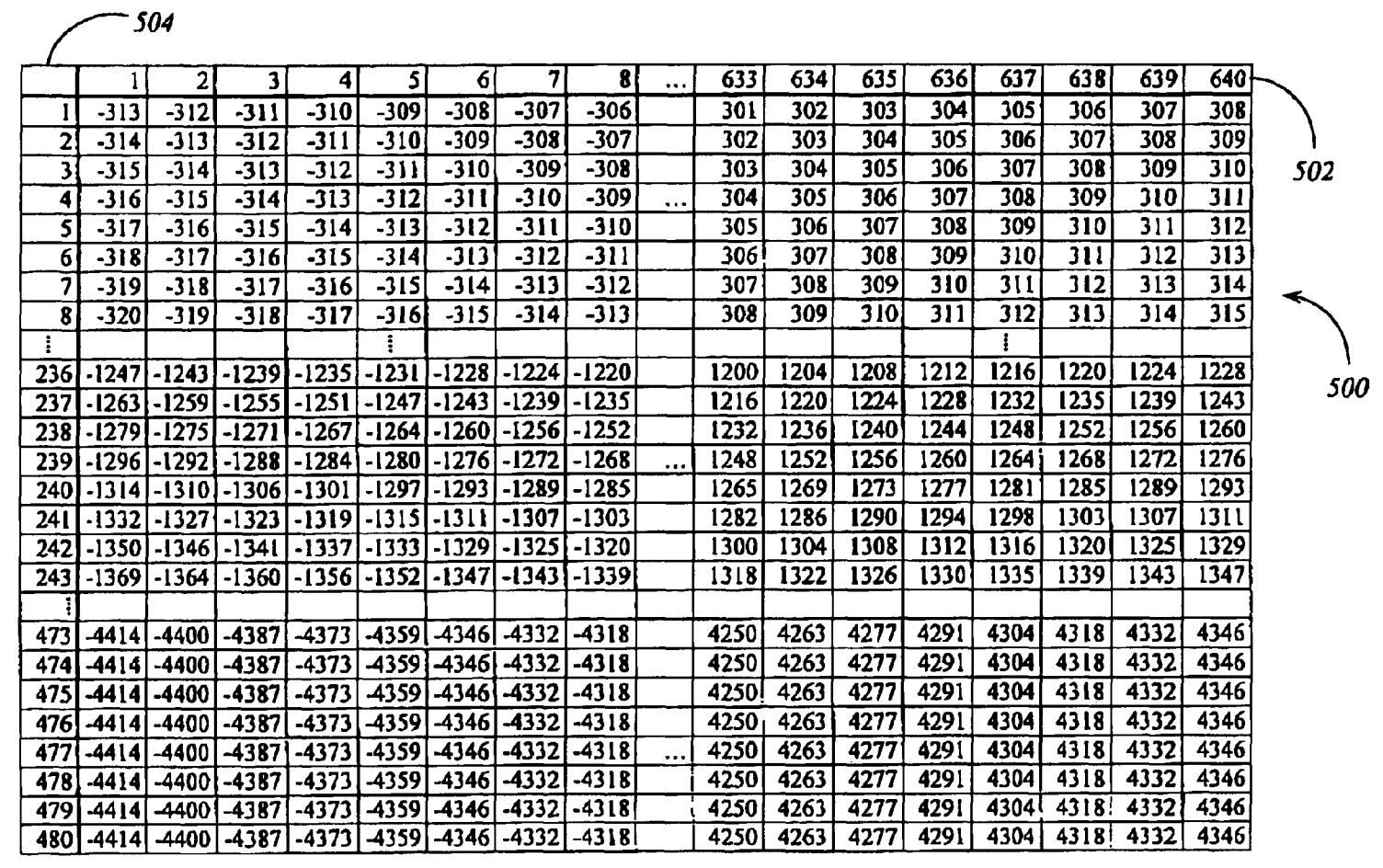
Figure 10:
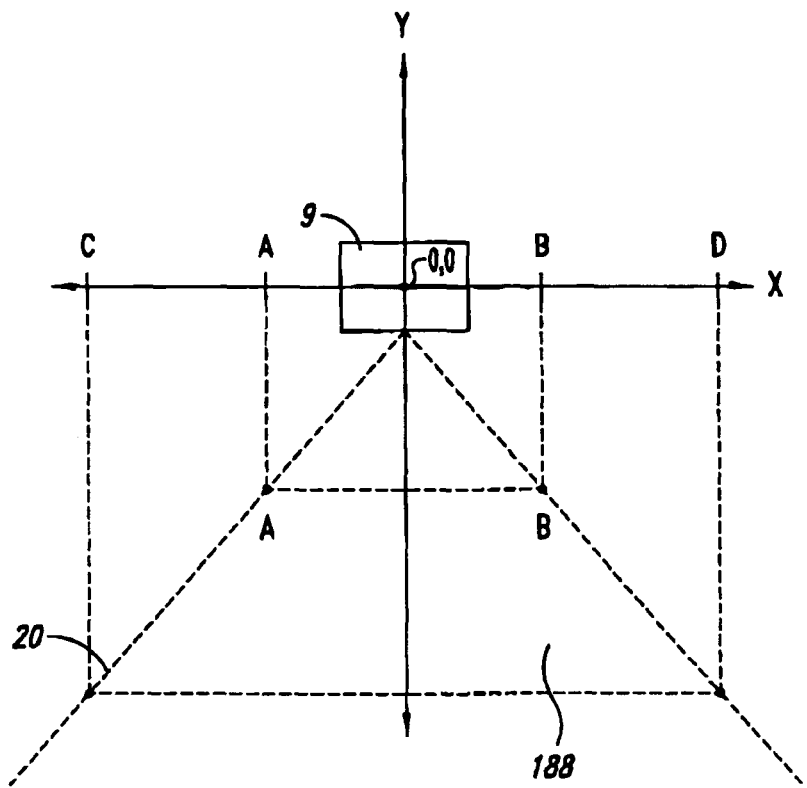
FIG. 10 is a top down view of a coordinate system superimposed over an apparatus and a working surface in accordance with the present disclosure.

The centers (row, column) of the detected objects are translated to the real world coordinate by using calibration tables. The calibration tables are composed of a mapping from the image coordinate (row, column) to the real world coordinate (x, y). FIGS. 8 and 9 are an exemplary X-axis calibration table 500 and a Y-axis calibration table 600 that are used to translate the location of the objects from the images to the display on the host device. FIG. 10 is a top down view of the apparatus 9 illustrating an X-axis and a Y-axis as referenced in the calibration tables 500, 600. The point 0, 0 on the X and Y axis of FIG. 10 passes through a center of the apparatus 9. The beam of light 20 is centered on the Y-axis and extends in both the positive and negative direction on the X-axis. Although, the beam of light 20 extends in what is normally referenced as the negative Y-axis, all of the values discussed with respect to the Y-axis will be considered positive, since only one half of the Y-axis is relevant to this discussion.

FIG. 8 is the X-axis calibration table 500 having a plurality of rows 504 and columns 502. The columns 502 represent columns 1-8 and 633-640. The rows 500 include rows 1-8, 236-243, and 473-480. The X-axis calibration table 500 includes 640 columns and 480 rows, which is consistent with a VGA sensor. In row 1, column 1, the value is negative 313 (−313), which may correspond to 31.3 mm. This value may correspond to point A on the X-axis of FIG. 10. The values illustrated in the X-axis calibration table 500 begin at a distance spaced from the apparatus 9 because the sensor system cannot accurately capture tips that are too close to the apparatus 9. In row 1, column 640, the value is positive 380, which may correspond to 30.8 mm. This value is represented by point B on the X-axis of FIG. 10.

In row 480, column 1, the value is negative 4414 (−4414), which may correspond to 441.4 mm. This value is represented by point C on the X-axis of FIG. 10. In row 480, column 640, the value is positive 4346, which may correspond to 434.6 mm. This value may be represented by point D on the X-axis of FIG. 10. A region 188 defined by the points A, B, C, and D translated onto the boundary of the beam of light 20 corresponds to the working area 36, which is available to be imaged by the sensor system.

In FIG. 9, the Y-axis calibration table 600 includes rows 1-8, 236-243, and 473-480. The values in each row increase gradually from 376 to 5995. Each column of the Y-axis calibration table 600 includes the same numbers for every row. The number of columns corresponds to the number of columns in the X-axis calibration table 500. Repeating the row values for each column of the Y-axis calibration table 600 may aid the software in determining location information for each image.

Row histograms are generated only for columns that have been determined to include a detected object, such as a finger or stylus. For example, a finger may take up five columns of pixels. For both row and column histograms, a center is determined by evaluating the total energy of a spike. The center of the spike is found by evaluating the spike to determine where the left and right side of the spike are of equivalent energies—this gives a row center value and a column center value. With the row center value and the column center value, the calibration tables are accessed to determine an x coordinate and a y coordinate.

For example, if the row center value is 242 and the column center value is 636, the x coordinate would be 1312 and the y coordinate value would be 1796. The x and y coordinates would be sent to the host device to display the cursor location on a display. Another example, if the row center value is 2.5 and the column center value is 6.5, then four values from the x-axis table and four values from the y-axis table will be evaluated, i.e., for the x-axis table, col. 2, row 6 (−317 value), col. 3, row 6 (−316 value), col. 2, row 7 (−318 value), and col. 3, row 7 (−317 value) would be evaluated. An average of all of the values is −317, which will be the x coordinate. Similarly, for the y-axis table, col. 2, row 6 (382 value), col. 3, row 6 (382 value), col. 2, row 7 (384 value), and col. 3, row 7 (384 value) would be evaluated. An average of all of these values is 383, which will be the y coordinate that is sent to the host processor.

It should be noted that in this embodiment, 480 pixels are available to represent a distance from front to back on the working surface. If a front-to-back distance that is proportional to the side to side distance is to be implemented, then the distances represented between rows may be greater than the distances represented between columns. A second reason why the differences between rows may differ from the distances between columns has to do with the shape of the working area on the working surface. The beam of light 20 extending from the light source unit 12 extends at an angle from the housing. Accordingly, the pixels capturing data that is farther away from the sensor 16 may represent greater changes in location than the pixels capturing data from a portion of the working area that is nearer to the sensor 16.

The calibration table 500 can be created during the testing of the apparatus. For example, the calibration table may be created by placing a unique image in front of the apparatus, capturing the image, then performing data processing on that image. Alternatively, the calibration table 500 may be created manually by placing an object in the working area, capturing an image, changing the location of the object in the working area, recapturing an image, and processing the data to determine how the object in the working area correlates with pixels in the image sensor.

The calibration table may be stored in memory and utilize by a processor located on the virtual memory device. Alternatively, the calibration table may be installed on a host device during installation of drivers on the host device which are operable to enable the host device to communicate with the apparatus.

The motion and gesture inference module uses the following rules to infer the multi-touch events from the finger or fingers or from an object:

Mouse move: if only one finger is in the virtual working area and its real world location is different from its previous location.

Left mouse switch down: if one finger is in the working area and then another finger on the left of the first finger goes down and touches the working area, i.e., the finger nearly vertically approaches the working area and touches the working area.

Left mouse switch up: After the left mouse down, if the finger on the left goes up (disappears from the working area 36 or vertically leaves the working area) or if both fingers go up out of the working area 36.

Right mouse switch down: if a first finger is in the working area 36 and a second finger on the right of the first finger goes down and touches the working area 36.

Right mouse switch up: After the right mouse down, if the finger on the right goes up (disappears from the working area 36) or both fingers go up.

Mouse drag: After the left mouse down, if both fingers move in unison within the working area 36 while maintaining their locations relative to one another.

Mouse single tap: if one finger is down in the working area 36 and then it goes straight up out of the working area 36 for a short period of time, which may be 1 or 2 seconds for example.

Mouse double taps: if the virtual mouse taps twice.

Flick forward: if one finger is down in the working area 36 and sweeps to the right and then up out of the working area 36 for a short period of time.

Flick backward: if one finger is down in the working area 36 and sweeps to the left and then up out of the working area 36 for a short period of time.

Scroll vertically: if two fingers touching each other or adjacent each other are down together and touch the working area 36 and then move forward (toward the sensor) or backward (away from the sensor) in unison without changing their locations relative to one another.

Scroll horizontally: if two close fingers are down and touch the working area 36 and then move to left or to the right in unison without changing their locations relative to one another.

Rotation: if two fingers are down and touch the working area 36 and either one of the fingers goes around the other finger clockwise or counterclockwise or both tips move around their middle point clockwise or counterclockwise in unison without changing their locations relative to one another.

Multi-point motion: if the device is switched to a multi point trace mode from the mouse mode and if there are multiple fingers in the working area 36. Each finger will be separately tracked and its movement will be reported.

For zoom in/out, the system computes the distance between two fingers. For rotation, the system computes the angle of the vector from one finger to the other finger.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
detecting at least one object breaking a plane of light in a working area;
capturing a plurality of images of the at least one object breaking the plane of light in the working area, each image of the plurality of images having a plurality of pixels in rows and columns;
generating a column histogram of each image by averaging pixel intensity values for each column of pixels;
determining at least one span of contiguous columns of average pixel intensity values that exceed a threshold column average pixel intensity value;
determining at least one spike of average pixel intensity values in the span of contiguous columns;
generating a row histogram of each image by averaging pixel intensity values for each row of pixels;
determining at least one span of contiguous rows of average pixel intensity values that exceed a threshold row average pixel intensity value;
determining at least one spike of average pixel intensity values in the span of contiguous rows; and
determining coordinates of the at least one object breaking the plane of light in the working area from the at least one spike of average intensity values in the span of contiguous columns and the at least one spike of average intensity values in the span of contiguous rows.

2. The method of claim 1, comprising determining a center point of the at least one object in the working area by determining a center column in the span of contiguous columns and determining a center row in the span of contiguous rows for each at least one object.

3. The method of claim 2 wherein determining the center of the span of contiguous columns and the center of the span of contiguous rows comprises determining the total number of columns in the span of contiguous columns and dividing the total number of columns by two and determining the total number of rows in the span of contiguous rows and dividing the total number of rows by two, respectively.

4. The method of claim 2, comprising determining if multiple objects are in the working area by determining if there are more than one spike of average pixel intensity values in the span of contiguous columns or more than one spike of average pixel intensity values in the span of contiguous rows.

5. The method of claim 2, comprising determining if multiple objects are in the working area by determining whether the span of contiguous columns is greater than a threshold span of contiguous columns or determining whether a span of contiguous rows is greater than a threshold span of contiguous rows.

6. The method of claim 1 wherein determining the coordinates of the object includes using an X-axis calibration table and a Y-axis calibration table that are associated with the working area.

7. A system for use with at least one object, comprising:
virtual mouse device that includes:
a light source mounted in a housing, the light source structured to continuously emit or pulse a thin fan beam of a specific frequency of light above a surface of interest;
a single sensor mounted in the housing, the single sensor having an optical lens structured to have a field of view that intersects the thin fan beam of light to define a virtual working area, and an optical filter, the sensor structured to detect at least one object breaking the thin fan beam of light in the working area and to capture a plurality of images of the at least one object in the working area, each image of the plurality of images having a plurality of pixels in rows and columns; and
a processor structured to generate a column histogram of each image by averaging pixel intensity values for each column of pixels, determine at least one span of contiguous columns of average pixel intensity values that exceed a threshold column average pixel intensity value, determine at least one spike of average pixel intensity values in the span of contiguous columns, generate a row histogram of each image by averaging pixel intensity values for each row of pixels, determine at least one span on contiguous rows of average pixel intensity values that exceed a threshold row average pixel intensity value, determine at least one spike of average pixel intensity values in the span of contiguous rows, determine coordinates of the at least one object breaking the plane of light in the working area from the at least one spike of average intensity values in the span of contiguous columns and the at least one spike of average intensity values in the span of contiguous rows, and to generate an output signal in response to the detection of the at least one object in the working area.

8. The system of claim 7, wherein the processor is further structured to determine a center point of the at least one object in the working area by determining a center column in the span of contiguous columns and determining a center row in the span of contiguous rows for each at least one object.

9. The system of claim 8 wherein determining the center of the span of contiguous columns and the center of the span of contiguous rows comprises determining the total number of columns in the span of contiguous columns and dividing the total number of columns by two and determining the total number of rows in the span of contiguous rows and dividing the total number of rows by two, respectively.

10. The system of claim 8 wherein the processor is structured to determine if multiple objects are in the working area by determining if there are more than one spike of average pixel intensity values in the span of contiguous columns or more than one spike of average pixel intensity values in the span of contiguous rows.

11. The system of claim 8 wherein the processor is structure to determine if multiple objects are in the working area by determining whether the span of contiguous columns is greater than a threshold span of contiguous columns or determining whether a span of contiguous rows is greater than a threshold span of contiguous rows.

12. The system of claim 7 wherein the processor is structured to determine the coordinates of the object by using an X-axis calibration table and a Y-axis calibration table that are associated with the working area.

13. The system of claim 8 further comprising a communication unit structured to transfer image data to a companion host device, and wherein the processor is housed in the companion host device.

* * * * *